United States Patent [19]

Sontheimer et al.

[11] 4,139,068
[45] Feb. 13, 1979

[54] METHOD AND APPARATUS FOR CONVERSION OF AN UNEVEN ARM BEAM BALANCE FROM METRIC WEIGHT TO ENGLISH WEIGHT MEASUREMENT AND VICE VERSA

[75] Inventors: Carl G. Sontheimer; Richard D. Clare, both of Greenwich, Conn.

[73] Assignee: Cuisinarts, Inc., Stamford, Conn.

[21] Appl. No.: 800,570

[22] Filed: May 25, 1977

[51] Int. Cl.² .................................... G01G 1/26
[52] U.S. Cl. .................................... 177/1; 177/247
[58] Field of Search ............... 177/246, 247, 264, 252, 177/1, 250

[56] References Cited

U.S. PATENT DOCUMENTS

| | | | |
|---|---|---|---|
| 351,528 | 10/1886 | Reynolds | 177/250 |
| 403,136 | 5/1889 | Pooley | 177/250 |
| 1,155,259 | 9/1915 | Menz | 177/252 |
| 3,927,725 | 12/1975 | Wood | 177/246 X |

FOREIGN PATENT DOCUMENTS 959,617  6/1964  United Kingdom ..................... 177/247

*Primary Examiner*—Joseph W. Hartary
*Attorney, Agent, or Firm*—Parmelee, Johnson, Bollinger & Bramblett

[57] ABSTRACT

Method and apparatus for conversion of an uneven arm beam balance from metric weight measurement to English weight measurement, and the reverse conversion are described. An illustrative example is a balance rated to measure in kilograms and having a main beam scale graduated in uniform increments of metric weight with associated notched poises, a main weight being discretely positionable in respective notches. A secondary beam scale in parallel relationship with the main beam reads from zero to a value equal to one such metric weight increment, along which a secondary (slider) weight is slidable for making the fine-tuning weight measurements between respective graduations of the main scale. For conversion, there is also provided on the main beam a main English scale graduated in uniform increments of English weight with associated notched poise arranged so that a shift in the position of the main weight by a distance equivalent to 400N Grams weighs an increase of N pounds Avoirdupois. For performing a measurement in pounds the main weight is increased by 13,398% accomplished by combining an auxiliary weight therewith or by substituting a heavier main weight. A secondary English scale is also provided reading from zero to a value equal to one such increment of English weight and having a length 13.398% longer, or a slider 13,398% heavier, than for the secondary metric scale.

28 Claims, 5 Drawing Figures

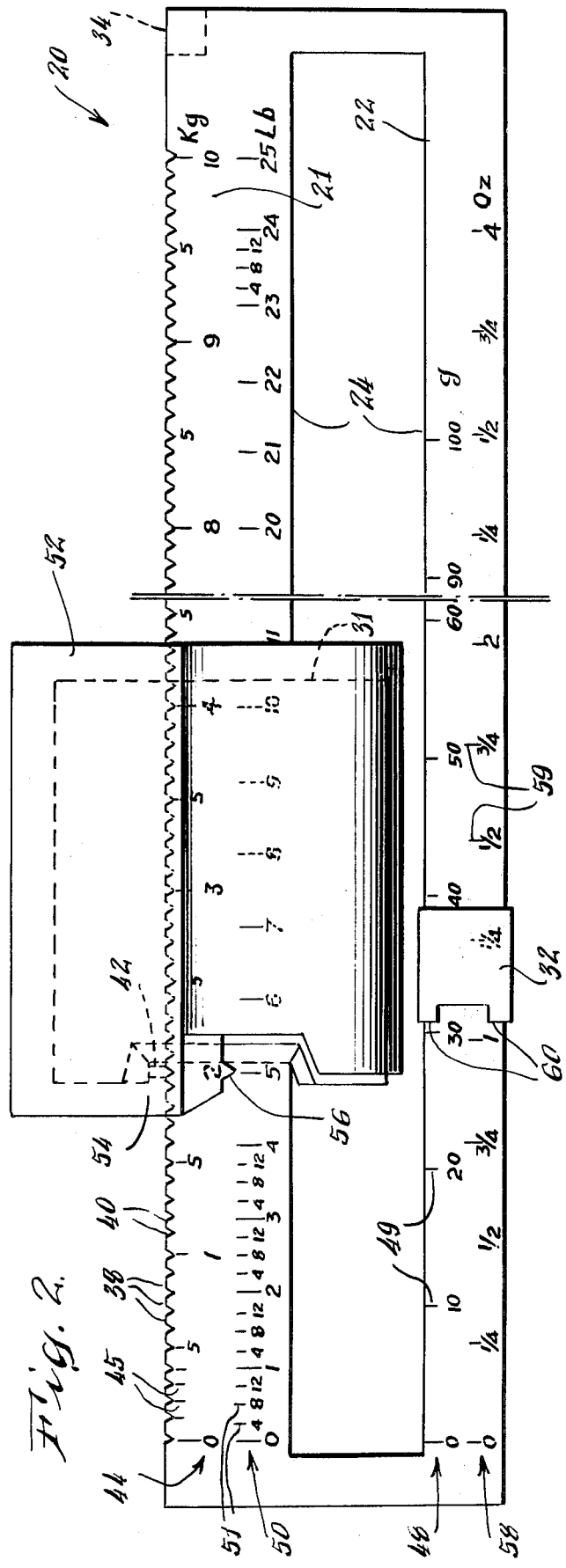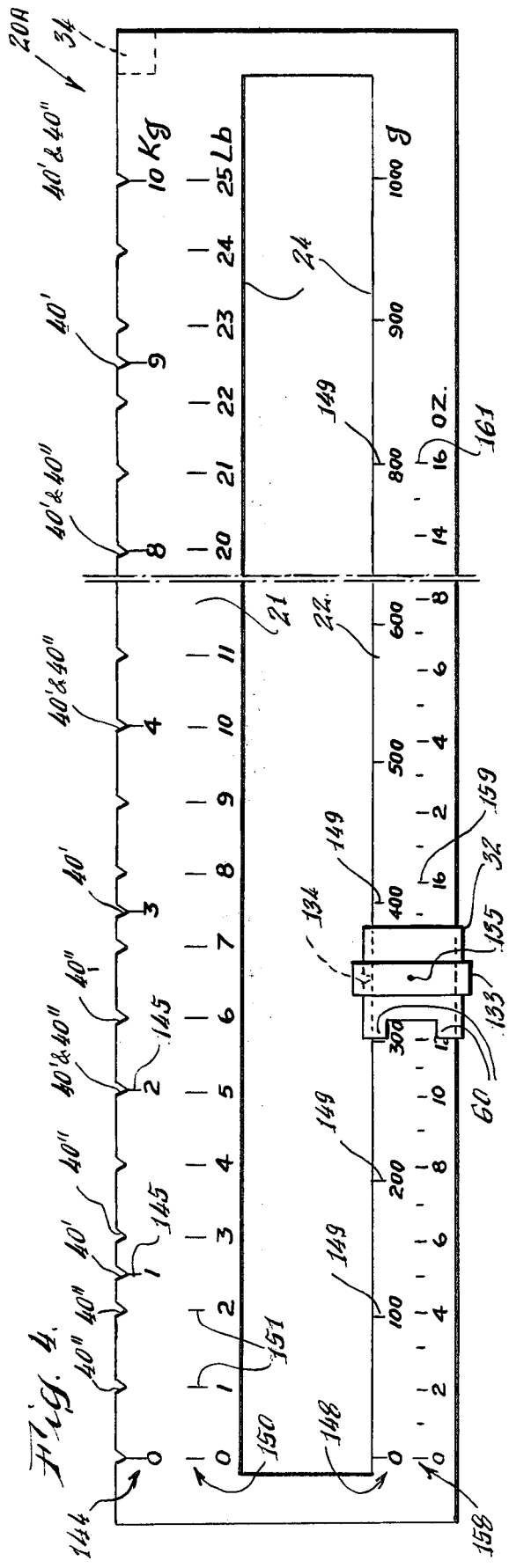

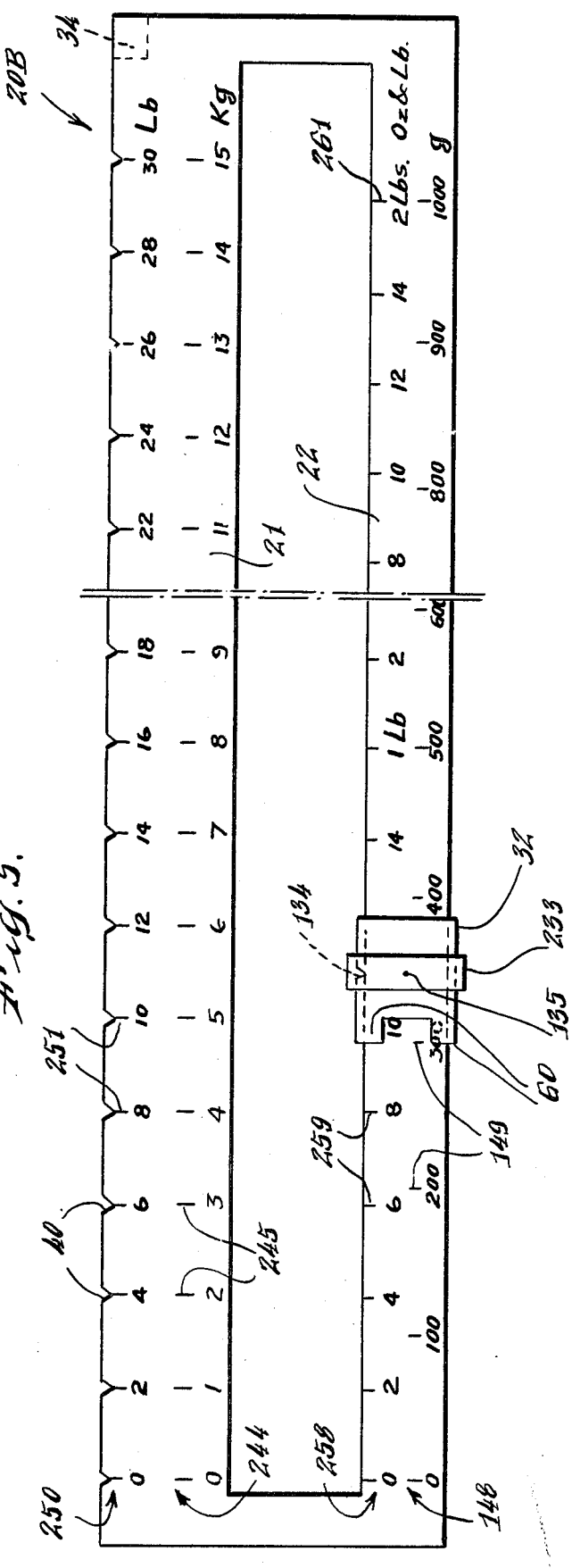

METHOD AND APPARATUS FOR CONVERSION OF AN UNEVEN ARM BEAM BALANCE FROM METRIC WEIGHT TO ENGLISH WEIGHT MEASUREMENT AND VICE VERSA

DESCRIPTION

Field of the Invention

The present invention is in the field of uneven arm beam balances of the type in which a weight is moved along a beam having a graduated scale until an equilibrium position is reached for accurately measuring the unknown weight of an object placed in the tray of the balance. More particularly, this invention relates to conversion of the balance from accurate measurement of the unknown weight in metric units, i.e. grams and/or kilograms, into accurate measurement in English units, i.e. ounces and/or pounds Avoirdupois.

Background of the Invention

There are applications in homes, in industry and in schools where it is desired to make accurate weight measurements by using uneven arm beam balances. In some instances, the measurements may be desired in metric units of grams, kilograms and in other instances the measurements may be desired in English units of ounces, pounds, Avoirdupois. For example, in certain formulations or in cookbooks, the quantities are specified in metric weight units and in others in English weight units. Moreover, since persons in the English-speaking countries have recently, or are about to, adopt the metric system in weights and measures, there is a need for conveniently measuring weight in either units. It is possible to have two different beam balances for the respective sets of measurements, but that involves a duplication of the whole balance mechanism and is expensive.

In theory, it would appear that the same main weight could be used in two different sequences of notches along the main beam of the balance for accurately measuring weight in either English or metric units. However, interference between notches is encountered at the positions of the notches where the weight to be measured can be expressed as a nearly integral number of pounds and of kilograms, e.g. 20 pounds and 9 kilograms. Twenty pounds is equal to 9.072 kilograms, and hence inaccuracies or indefiniteness would occur involving the positioning of the weight on the beam.

The present invention overcomes these difficulties and enables a single beam balance to be conveniently converted economically from metric weight to English weight measurement, and vice versa.

Summary of the Invention

The present invention provides method and apparatus for conversion of an uneven arm beam balance from accurate metric weight measurement to accurate English weight measurement, and vice versa. As used herein, the term "English" weight units is intended to mean pounds and ounces Avoirdupois.

In one aspect of the invention and in an illustrative embodiment, as shown, the main beam is provided with a main metric scale graduated in uniform increments per notched poise on which a main weight is positionable in respective discrete notches. A secondary beam in parallel relationship with the main beam has a secondary metric scale reading from zero to up to a value equal to one such increment on the main scale, and a secondary slider weight is movable along the secondary scale into any desired position for fine-tuning weight measurement between the respective graduations of the main scale. For conversion, there is also provided on the main beam a main English scale graduated in uniform increments of English weight with associated notched poises. This conversion English scale is arranged so that a shift in position of the main weight by a distance equivalent to 400N grams represents an increase of N pounds Avoirdupois.

For performing a measurement in pounds, the main weight is increased by 13.398%. This increase is accomplished by combining an auxiliary weight with the main weight. Alternatively, a heavier main weight for making weight measurements in English units may be substituted for the lighter main weight which is used for making measurements in metric units. On the secondary beam, a secondary English scale is also provided reading from zero to one of the incremental graduations of the main English scale and having a length 13.398 longer than, or a slider 13.398% heavier than, the secondary metric scale.

For example, a 10 kilogram beam scale can also conveniently weigh in English units over a range from zero to 20 or 25 pounds, depending upon the overall length of the main English scale.

In another aspect of the invention, a shift in position of the main weight by 2N pounds is equivalent to an increase in metric weight by N kilograms. In this illustrative embodiment, the main weight is increased by 10.231% for conversion from English to metric weight measurements. The corresponding length of the secondary metric scale or the slider weight is also increased by 10.231%.

In balances where the main weight in its zero position is offset from the fulcrum of the beam, then the center of gravity (c.g.) of the increased main weight is offset a lesser distance from the fulcrum than the c.g. of the original main weight.

Advantageously, the same beam balance embodying this invention can be used to make very accurate weight measurements in either metric or English units, and the conversion is readily made by the user.

BRIEF DESCRIPTION OF THE DRAWINGS

The various advantages, objects and features of the present invention will become more fully understood from a consideration of the following description in conjunction with the accompanying drawings which are illustrative of certain embodiments of this invention and in which like reference numbers represent corresponding parts throughout the different Figures.

In the drawings:

FIG. 2 is a front elevational view of the main beam and secondary beam each graduated in both metric and English units, an auxiliary weight being added to the main weight for making measurements in English units;

FIGS. 4 and 5 are front elevational view of other main and secondary beams with different arrangements of both metric and English units embodying the invention for conversion therebetween.

DETAILED DESCRIPTION

Figure 1:
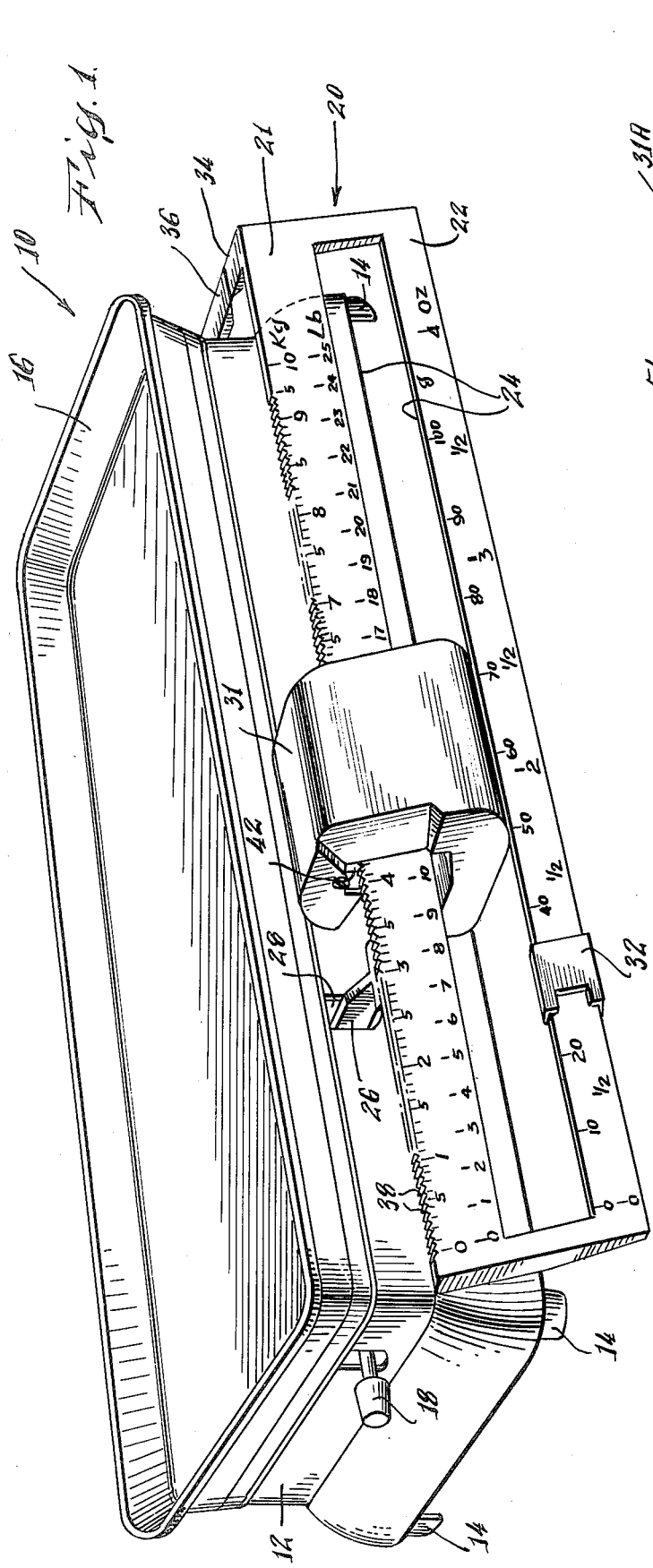
FIG. 1 is a perspective view of a beam balance having a tray on which to place the objects to be weighed embodying the invention for conversion between weighing in metric and English units.

As shown in FIG. 1, there is a beam balance 10 having a frame 12 resting on feet 14 and with a receptacle shown as a tray 16 on which the objects are placed to be weighed. The unequal arm lever mechanism within the frame 12 is conventional and need not be described in detail. A rotatable zero cablibrating knob 18 allows the user to adjust the balance precisely to indicate zero when the tray 16 is empty.

Extending across the front of the beam balance 10 is a weighing arm 20 having a generally rectangular shape including a main beam 21 and a secondary beam 22 spaced from and parallel with the main beam. These two beams 21 and 22 define an elongated opening or window 24 between them.

This arm 20 can swing up and down about a fulcrum (not shown) which is located in a position aligned near the left end of the arm and is mounted on a movable bracket 26 extending through a clearance opening 28 in the frame 12. The movable bracket 26 connects the arm 20 to the unequal arm lever mechanism within the frame 12.

In order to weigh an object, it is placed on the tray 16, and the weights 31 and 32 (to be described in detail) are manually positioned along the main and secondary beams 21 and 22. The right end of the arm 20 swings up and down during positioning of the weights. When the weights have been properly placed to bring the weighing mechanism into balance, an index element 34 mounted on the right end of the arm 20 and in the form of an indicating pointer, becomes aligned with a second fixed index element 36 also in the form of a pointer.

Along the top of the main beam 21 (see FIG. 2) is a sequence of notched poises or teeth 38 defining a uniformly spaced row of discrete positioning notches 40 extending along the main beam. The main weight 31 has a locator element 42 in the shape of a pointed probe which can be positioned in any one of the notches 40 for accurately positioning the main weight at predetermined uniformly spaced positions along the main beam.

A main sequence or scale 44 of metric weight unit graduations 45 extends along the main beam 21. Each of said main metric graduations 45 corresponds to a respective one of said predetermined discrete positions at which the main weight 31 is located by said notches 40. It is noted that this sequence 44 of the main metric graduation 45 includes multiples of 400 grams. In this example, the main metric graduations are shown as having indicated values from 0 ("zero") to 10 kilograms in increments of 100 grams.

A secondary sequence or scale 48 of metric weight unit graduations 49 extends along the secondary beam 22, said secondary metric graduations 49 having indicated values each of which is a predetermined decimal fraction of the indicated value of said main metric graduations. In this illustrative example, the decimal fraction is 1/10th, and thus the secondary metric graduations are scaled from 0 ("zero") to 100 grams in increments of ten grams. It is noted that this scale 48 of secondary metric graduations 49 at least spans a range of values equal to the difference in indicated value between the adjacent main metric graduations 45, e.g. the difference between 100 grams and 200 grams, or the different between 200 grams and 300 grams, and so forth.

The secondary weight 32 is of predetermined mass and is slidable along the secondary beam to any desired selected position. The predetermined mass of this secondary weight is sufficiently large that when it is moved along the scale 48 of secondary metric graduations over said range from 0 to 100 grams, it produces a rebalancing effect equivalent to a change in position of the original main weight 31 from one predetermined position to the next adjacent predetermined position.

In order to convert for measurement in English units, there is also provided on the main beam 21 another main sequence or scale 50 of English weight unit graduations 51. Each of the English graduations 51 corresponds to a respective one of the discrete positions at which the main weight is located by the notches 40. The English scale in this embodiment has graduations from 0 to 25 pounds in increments of 4 ounces.

It is to be noted that the English scale is arranged and spaced such that a shift in position of the locator element 42 of the main weight by a distance equivalent to a change in measured weight of 400 N grams (where "N" is any positive integer of reasonable size) will also be equivalent to an increase of N pounds Avoirdupois. In other words, in this illustrative embodiment in FIGS. 1 and 2, there is a correspondence in position of the notches 40 as follows:

| Metric Graduation: | Corresponds to: | English Graduation: |
|---|---|---|
| 400 grams | | 1 pound |
| 800 grams | | 2 pounds |
| 1200 grams | | 3 pounds |
| 1600 grams | | 4 pounds |
| 2 Kilograms | | 5 pounds |
| etc. | | etc. |

Figure 3:
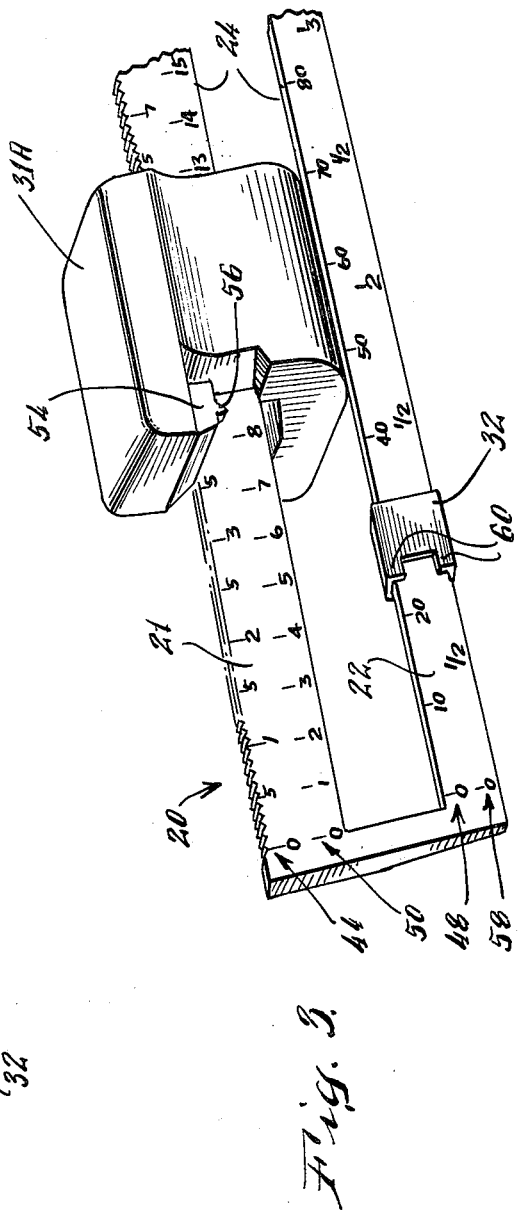
FIG. 3 is a partial perspective view of a main and secondary beam, such as shown in FIG. 1, and in which a heavier main weight is substituted for making measurements in English units.

Actually, one pound is equal very nearly to 453.5924 grams. Dividing this number by 400 grams gives a quotient of 1.133981. Therefore, in order to make a measurement in English units using the scale arrangements, as shown in FIGS. 1 and 2, the main weight 31 is increased in weight by 13.398%. This increased weight can be achieved in either of two ways: (a) by adding an auxiliary weight 52 in piggy back fashion to the main weight, as shown in FIG. 2, or (b) by substituting a heavier main weight 31A, as shown in FIG. 3. The auxiliary weight 52 (FIG. 2) engages with and seats in a precisely predetermined position over the original main weight 31 so that the two become combined as one and can be moved together as a unit. As shown, the auxiliary weight 52 has a concavity 53 so that it will fit directly onto the main weight and become unitarily coupled therewith in only one precisely predetermined position. Moreover, the mass of this auxiliary weight 52 is distributed so that its center of gravity (c.g.) bears a predetermined relationship to the c.g. of the main weight, as will be explained in detail further below.

For convenience of the user, the auxiliary weight 52 has a cover portion 54 which covers over and blanks out the locator pointer 42 and which is shown covering the adjacent part of the metric scale 44. The auxiliary weight also includes an auxiliary pointer index 56 which points to the respective graduations 51 of the English scale 50 that are intended to be read by the user.

For making measurements in English units, the secondary beam 22 includes a secondary English scale 58 reading from zero to 4 ounces and having an overall length which is 13.398% greater than the length of the secondary metric scale 48. Thus, the same secondary weight or slider 32 is used for performing the fine-tuning metric or English weighing operation. This secondary weight 32 has index means 60 associated therewith for indicating the secondary scale values to be read along either of the scales 48 or 58. As shown, the index means 60 is formed by sharply delineated edges of the slider weight 32.

In lieu of making the secondary English scale 58 longer by 13.398% than the secondary metric scale 48, the slider weight 32 may be increased 13.398% in weight by adding an auxiliary weight or by substituting a heavier weight.

As shown in FIG. 3, a heavier weight 31A is substituted for the original main weight. This substitute weight has a cover portion 54 which blanks out part of the meteric scale 44 and indicates the respective graduations of the main English scale 50 to be read. The mass of this substitute main weight 31A is distributed so that its c.g. has a predetermined relationship to the c.g. of the original main weight, as will be explained in detail further below. The secondary scales 48 and 58 in FIG. 3 and the slider weight 32 are similar to what is shown in FIG. 2.

It is to be noted that the embodiments of the invention described in connection with FIGS. 1-3 are readily converted back for making measurements in metric weight units by returning to use of the original weight 31.

If desired to aid the user, the metric values can be printed in one color, e.g., red, and the English values in another color, e.g. black, for enhancing the distinctiveness of the respective scales.

In the embodiment of the invention, as shown in FIG. 4, there is a first sequence of notches 40' on the main beam 21 which are used for making metric measurements. The metric scale 144 has graduations 145 reading 1 kilogram, 2 kilograms, and so forth. A second sequence of notches 40" are used for making English measurements. The English scale 150 has graduations 151 arranged and spaced such that a shift in position of the locator element of the main weight (not shown in FIG. 4) by a distance equivalent to a change in measured weight of 400 N grams will also be equivalent to an increase of N pounds. It is noted that the main weight has been omitted from the main beam 21 in FIG. 4 for clarity of illustration. The main weight may be similar in structure to the main weight 31 shown in FIGS. 1 and 2.

In FIGS. 1-3 all of the notches 40 along the main beam may be used for making either metric weight or English weight measurements. However, in this example, as shown in FIG. 4, there are ten (not counting zero) of the notches 40' for discretely positioning the main weight at the respective metric graduations 145. There are twenty-five (not counting zero) of the notches 40" for discretely positioning the main weight at the respective English graduations 151. In this embodiment, every second notch 40' for metric weighing coincides exactly with every fifth notch for English weighing and a common notch 40' and 40" is used for making measurements on either metric of English scale 144 or 150, respectively. In other words, the 2 kilogram notch and the 5 pound notch are the same; the 4 kilogram and 10 pound notch are the same; and so forth.

In FIG. 4, the secondary metric scale 148 has graduations 149 reading from 0 to 1000 grams. This range in value corresponds with the difference in value between successive graduations 145 of the main metric scale, e.g., from 1 kilogram to 2 kilograms.

When making the conversion in FIG. 4 from metric weight measurement to English weight measurement, the mass of the main weight must be increased by 13.397% in the same manner as described in connection with FIGS. 1 and 2 or FIG. 3.

In FIG. 4, for conversion from metric to English unit weight measurement, the mass of the slider weight 32 is increased 13.398% by adding an auxiliary weight 133 thereto. This auxiliary weight 133 has a generally C-shaped cross section and clips onto the slider weight 32. As shown in FIG. 4, there is a small indentation or detent 134 which serves to position the auxiliary weight 133 precisely onto the slider weight, so that the two weights 32 and 133 are moved together as a unit. The center of gravity 135 of the auxiliary weight 133 is aligned in the horizontal direction with the center of gravity of the slider weight 32.

The secondary English scale 158 reads in a first span from zero to 16 ounces, with the graduation 159 for 16 ounces being aligned with the graduation 149 for 400 grams. If desired, the secondary English scale 158 may end at the graduation 159.

Alternatively, if desired, the secondary English scale 158 may repeat in a second span from zero to 16 ounces, with the graduation 161 for the second occurrence of 16 ounces being aligned with the graduation 149 for 800 grams.

Thus, in the embodiment of FIG. 4, by increasing the main weight 13.398% by either of the methods discussed and by adding an auxiliary weight 133 of 13.398% to the slider weight, the user conveniently converts an unequal beam balance including the arm 20A from metric to English weight measurement. The conversion back from English to metric weight measurement is conveniently made by removing the auxiliary weight 133 from the slider 32 and by returning to use of the original main weight.

It is to be understood that by employing the methods and apparatus, as shown in FIGS. 1-4, various unequal arm beam balances each having one or more of the following weighing conversions, and vice versa, can be constructed. The conversions are readily and conveniently made, with appropriate values being indicated on the main and secondary beams of the respective balances:

| Metric Graduation | Corresponding to: | English Graduation |
|---|---|---|
| 400 grams | | 1 pound |
| 2 kilograms | | 5 pounds |
| 4 kilograms | | 10 pounds |
| 10 kilograms | | 25 pounds |
| 40 kilograms | | 100 pounds |
| 100 kilograms | | 250 pounds |
| ect. | | etc. |

In FIG. 5, the balance arm 20B has the same sequence of notches 40 to be used for both English and metric weight measurements. The English scale 250 has graduations 251 reading from 0 to 30 pounds in 2 pound increments, while the metric scale 244 has graduations 245 reading from zero to 15 kilograms in 1 kilogram increments. It is to be understood that there is a main weight, which is not shown for clarity of illustration, similar to the weight 31 in FIGS. 1 and 2 which has a locator positionable in the respective notches 40.

On the secondary beam 22, there is a secondary English scale 258 having graduations 259 reading from 0 to 16 ounces in 2 ounce increments in a first span. Then this scale repeats from 0 to 16 ounces in a second span such that moving the slider weight 32 from the initial zero to the final graduation 261 represents an increase in measured weight of two pounds, being equal to the differential in value between successive main English graduations 251. On this secondary beam in FIG. 5, there is also a secondary metric scale 148 having graduations 149 reading from 0 to 1,000 grams in 100 gram increments. It is to be understood that both the scales 258 and 148 may include additional intermediate graduations between the graduations 159 and 149 for aiding the reader in determining intermediate values.

In actuality, 1 kilogram is approximately equal to 2.20462 pounds. Therefore, in order to convert for measuring weight in English units to metric units using the balance arm 20B shown in FIG. 5, the main weight is increased by 10.231%. This increase may be accomplished by adding an auxiliary weight such as shown in FIG. 2, or by substituting a heavier main weight such as shown in FIG. 3.

The slider weight 32 is also increased in weight by 10.231% by adding an auxiliary weight 233 thereto, which has a C shape as seen in cross section for clipping onto the slider 32. Its c.g. 135 is horizontally aligned with the c.g. of the slider weight itself.

As an alternative to the use of an auxiliary weight, a 10.231% heavier substitute slider may be used in FIG. 5 for making metric measurements.

A further alternative is to use the same slider 32 but to expand the overall length of the secondary metric scale 148 by 10.231% relative to the overall length of the secondary English scale from zero to the last graduation 261.

It is to be understood that by employing the methods and apparatus as described in connection with FIG. 5, various unequal arm beam balances can be constructed each having one or more of the following weighing conversions, and vice versa. And such are readily and conveniently made, with appropriate values being indicated on the main and secondary beams of the respective balances:

| English Graduations | Corresponding to: | Metric Graduations |
| --- | --- | --- |
| 2 pounds | | 1 kilogram |
| 10 pounds | | 5 kilograms |
| 20 pounds | | 10 kilograms |
| 100 pounds | | 50 kilograms |
| 200 pounds | | 100 kilograms |
| etc. | | etc. |

The following discussion relates to the location of the c.g. of the original main weight 31 and of the increased main weight 31 plus 52 (FIG. 2) or 31A (FIG. 3). The main weight 31 may be used as a counterweight when it is at its zero position. In other words, the c.g. of the main weight may be positioned horizontally to the left of alignment with the fulcrum for the balance arm 20 or 20A or 20B. In order to calculate the appropriate position for the c.g. of the increased main weight, the following calculations may be used.

Let "D" equal the original horizontal offset of the c.g. of the main weight from alignment with the fulcrum of the arm 20, 20A or 20B; let "W" equal the original weight of the main weight 31; and let "d" equal the offset of the increased main weight, 31 plus 52, or 31A. The moment arm with the increased weight at the zero position must equal the original moment arm, as follows:

$$WD = (W + 0.13398W)d \quad (1)$$

$$d = WD/1.13398W = D/1.13398 \quad (2)$$

Thus:

$$d = 0.88185 \quad (3)$$

In other words, the new offset "d" is 88.185% of the original offset, when the increased weight is 13.398% heavier than the original main weight.

On the other hand, when the increased weight is 10.231% heavier than the calculation is:

$$WD = (W + 0.10231W)d \quad (4)$$

$$d = D/1.10231 \quad (5)$$

Thus:

$$d = 0.90719 \quad (6)$$

Then, the new offset "d" is 90.719% of the original offset, when the increased weight is 10.281% heavier than the original main weight.

In cases where the c.g. of the original main weight aligns with the fulcrum in the horizontal direction of the arm 20, or 20A, or 20B, then the c.g. of the increased weight should also align with the fulcrum. From a mathematical point of view, this is a special case of equation (1) or (4), because reducing the original offset "D" to zero also reduces "d" to zero.

In the foregoing description, N is a positive integer having a reasonable size, namely, up to 1,000.

Our presently preferred mode of employing the invention is to add an auxiliary weight to the main weight to obtain the increased weight rather than removing the original main weight and substituting a replacement. We also presently prefer adding an auxiliary weight to the slider rather than using a longer secondary scale because this provides the same sensitivity of weight measurement for both metric and English units. We also prefer adding an auxiliary weight to the slider rather than substituting a heavier slider because this is more convenient for the user.

We claim:

1. In an unequal arm beam balance having a receptacle onto which the object to be weighed is placed and having a weighing arm which swings up and down about a fulcrum during a weighing operation, this weighing arm including a main beam along which an original main weight can be moved into discrete predetermined positions as defined by a sequence of notches, said original main weight being positioned along said main beam and having a locator element engageable in said discrete notches for selectively locating said main weight at any one of said predetermined positions, said main weight being intended for making metric weight unit measurements and having a reading index for showing the user which of said main metric graduations corresponds with the predetermined position of said main weight, and also including a parallel secondary beam along which a secondary weight can be slid into any desired position for making measurements of fractional values of weight intermediate the values of weight corresponding to said main metric graduations, the method of conversion of the balance from weighing in metric weight units to weighing in English weight units comprising the steps of:

providing a main sequence of metric weight unit graduations extending along the main beam with predetermined main metric graduations corresponding to respective predetermined discrete positions, said sequence of main metric graduations including at least one graduation corresponding to 400 N grams (where "N" is a positive integer lying in the range up to 1,000, providing a secondary sequence of metric weight unit graduations extending along the secondary beam, said secondary metric graduations having indicated values each of which is a predetermined decimal fraction of said main metric graduations and said secondary metric graduations at least spanning a range of values equal to the difference in indicated value between adjacent main metric graduations, said secondary weight being of predetermined mass movable along said secondary beam to any desired selected position therealong, said predetermined mass of said secondary weight when moved along said secondary metric graduations over said range producing a rebalancing effect equivalent to a change in position of the original main weight from one predetermined postion to the next adjacent predetermined position, providing a main sequence of English weight unit graduations extending along the main beam with predetermined ones of said main English graduations corresponding to predetermined discrete positions, said sequence of main English graduations including a graduation having a value of "N" pounds and which corresponds in position to the main metric graduation which is 400 N grams, providing an increased main weight 13.308% heavier than said original main weight and being intended for making English weight unit measurements, said increased weight being positionable along said main beam at said predetermined main English graduations and having a reading index for showing the user which of said English graduations corresponds with the predetermined position of said increased main weight, said increased main weight having its center-of-gravity aligned in the horizontal direction with the center-of-gravity of said original main weight, providing a secondary sequence of English weight unit graduations extending along the secondary beam, said secondary English graduations having indicated values at least spanning a range of values equal to the difference in indicated value between adjacent main English graduations, and providing for secondary weight action along said range of secondary English graduations exerting a moment 13.398% greater than the moment of said secondary weight along said range of secondary metric graduations, secondary weight action along said range of secondary English graduations having its center-of-gravity aligned in the horizontal direction with said secondary weight action along said range of secondary metric graduations.

2. In an unequal arm beam balance, the method of conversion of the balance from weighing in metric weight units to weighing in English weight units, as claimed in claim 1, in which:

said increased main weight is provided by removing the original main weight from said main beam and by substituting therefor another main weight which is 13.398% heavier than said original main weight, said other main weight having a locator element engageable in said notches.

3. In an unequal arm beam balance, the method of conversion of the balance from weighing in metric weight units to weighing in English weight units, as claimed in claim 1, in which:

said increased main weight is provided by coupling an additional weight to said original main weight for movement together therewith, said additional weight having a weight equal to 13.398% of the weight of said original main weight, and having its center-of-gravity horizontally aligned with the center-of-gravity of said original main weight.

4. In an unequal arm beam balance, the method of conversion of the balance from weighing in metric weight units to weighing in English weight units, as claimed in claim 3, in which:

said additional weight is coupled piggy back onto said original main weight.

5. In an unequal arm beam balance, the method of conversion of the balance from weighing in metric weight units to weighing in English weight units, as claimed in claim 1, said main metric graduations include a graduation indicated as "zero" weight and said original main weight has a center of gravity (c.g.) which is offset horizontally by a predetermined original offset distance from alignment with the fulcrum of the weighing mechanism when the original main weight is located at the predetermined position at which the reading index indicates "zero", and in which:

said increased main weight is provided in a manner for causing the c.g. thereof to be offset horizontally from alignment with the fulcrum by a new distance which is 88.185% of said original offset distance.

6. In an unequal arm beam balance, the method of conversion of the balance from weighing in metric weight units to weighing in English weight units, as claimed in claim 1, said main metric graduations include a graduation indicated as "zero" weight and said original main weight has a center of gravity (c.g.) which is offset by a predetermined original horizontally offset distance from alignment with the fulcrum of the weighing mechanism when the original main weight is located at the predetermined position at which the reading index indicates "zero", and in which:

said increased main weight is provided by coupling an additional weight to said original main weight for movement together therewith, said additional weight having a weight equal to 13.398% of the weight of said original main weight, and arranging said additional weight for causing its c.g. to be aligned with the fulcrum when original main weight is located at the predetermined position at which the reading index indicates "zero".

7. In an unequal arm beam balance, the method of conversion of the balance from weighing in metric weight units to weighing in English weight units, as claimed in claim 1, in which:

said increased moment of said secondary weight action is provided by spacing said range of secondary English graduations over a distance along said secondary beam which is 13.398% longer than said range of secondary metric graduations, and provided said secondary weight with reading index means associated therewith for indicating which of said secondary metric or English graduations corresponds with the selected position occupied by said secondary weight.

8. In an unequal arm beam balance, the method of conversion of the balance from weighing in metric weight units to weighing in English weight units, as claimed in claim 1, in which:

said increased moment of said secondary weight action is provided by coupling an auxiliary weight to the original secondary weight for movement together therewith, said auxiliary weight having a weight equal to 13.398% of the weight of said original secondary weight, said auxiliary weight having its center-of-gravity aligned in the horizontal direction with the center-of-gravity of said original secondary weight.

9. In an unequal arm beam balance, the method of conversion of the balance from weighing in metric weight units to weighing in English weight units, as claimed in claim 1, in which:

a first sequence of uniformly spaced notches is provided along said main beam corresponding to said main sequence of metric graduations, and in which:

providing a second sequence of uniformly spaced notches along said main beam corresponding to said main sequence of English graduations, successive notches of said second sequence being spaced apart 2K/5ths as far as successive notches of said first sequence, where K is a positive integer equal to 1 or 2, and positioning said second sequence on said arm for causing every fifth notch thereof to be coincident with every 2Kth notch of said first sequence.

10. In an unequal arm beam balance having a receptacle onto which objects to be weighed are placed and having a weighing arm which swings up and down about a fulcrum during a weighing operation, this weighing arm including a main beam along which an original main weight can be moved into discrete predetermined positions as defined by notches, said original main weight being positionable along said main beam and having a locator element engageable in said discrete notches for selectively locating said main weight at discrete predetermined positions, said main weight being intended for making English weight unit measurements and having a reading index for showing the user which of said main English graduations corresponds with the predetermined position of said main weight, and also including a parallel secondary beam along which a secondary weight can be slid into any desired position for making measurements of values of weight intermediate the values of weight corresponding to said main English graduations, the method of conversion of the balance from weighing in English weight units to weighing in metric weight units comprising the steps of:

providing a main scale of English weight unit graduations extending along the main beam with predetermined main English graduations corresponding to respective predetermined discrete positions, said main English graduations including at least one graduation corresponding to 2N pounds (where "N" is a positive integer lying in the range up to 1,000), providing a secondary scale of English weight unit graduations extending along the secondary beam, said secondary English graduations having indicated values each of which is a predetermined fraction of the differential in indicated value between successive main English graduations and said secondary scale at least spanning a range of values equal to said differential, said secondary weight being of predetermined mass movable along said secondary beam to any desired selected position therealong, said predetermined mass of said secondary weight when moved along said secondary scale over said range producing a rebalancing effect equivalent to a change in position of the original main weight from one main English graduation to the next successive main English graduation, providing a main scale of metric weight unit graduations extending along the main beam with predetermined ones of said main metric graduations corresponding to predetermined discrete positions, said scale of main metric graduations including a graduation having a value of "N" kilograms and which corresponds in position to the main English graduation having an indicated value of 2N pounds, providing an increased main weight 10.231% heavier than said original main weight and being intended for making metric weight unit measurements, said increased weight being positionable along said main beam at said main metric graduations and having a reading index for showing the user which of said metric graduations corresponds with the predetermined position of said increased main weight, increased main weight having its center-of-gravity aligned horizontally with the center-of-gravity of said original main weight, providing a secondary scale of metric weight unit graduations extending along the secondary beam, said secondary metric graduations having indicated values at least spanning a range of values equal to the difference in indicated value between successive main metric graduations, and providing for secondary weight action along said secondary scale of metric graduations to exert a moment effect 10.231% greater than along said secondary scale of English graduations, and aligned in the horizontal direction therewith.

11. In an unequal arm beam balance, the method of conversion of the balance from weighing in English weight units to weighing in metric weight units, as claimed in claim 10, in which:

said increased main weight is provided by removing the original main weight from said main beam and by substituting therefore another main weight which is 10.231% heavier than said original main weight, the substitute main weight having a locator element engageable in said notches, having its c.g. aligned in the horizontal direction with the c.g. original main weight.

12. In an unequal arm beam balance, the method of conversion of the balance from weighing in English weight units to weighing in metric weight units, as claimed in claim 10, in which:

said increased main weight is provided by coupling an auxiliary weight to said original main weight for movement together therewith, said auxiliary weight having a weight equal to 10.231% of the weight of said original main weight, said auxiliary main weight having its c.g. aligned horizontally with the c.g. of said original main weight.

13. In an unequal arm beam balance, the method of conversion of the balance from weighing in English weight units to weighing in metric weight units, as claimed in claim 12, in which:
said auxiliary weight is coupled piggy back onto said original main weight.

14. In an unequal arm beam balance, the method of conversion of the balance from weighing in English weight units to weighing in metric weight units, as claimed in claim 10, in which:
said main metric graduations include a graduation indicated as "zero" weight and said original main weight has a center of gravity (c.g.) which is offset by a predetermined original horizontal offset distance from alignment with the fulcrum of said weighing arm when the original main weight is located at the predetermined position at which the reading index indicates "zero", and in which:
said increased main weight is provided in a manner for causing the c.g. thereof to be offset horizontally from alignment with the fulcrum by a new distance which is 90.719% of said original horizontal offset distance.

15. In an unequal arm beam balance, the method of conversion of the balance from weighing in English weight units to weighing in metric weight units, as claimed in claim 10, in which:
said main metric graduations include a graduation indicated as "zero" weight and said original main weight has a center of gravity (c.g.) which is offset by a predetermined original horizontal offset distance from alignment with the fulcrum of said weighing arm when the original main weight is located at the predetermined position at which the reading index indicates "zero", and in which:
said increased main weight is provided by coupling an auxiliary weight to said original main weight for movement together therewith, said auxiliary weight having a weight equal to 10.231% of the weight of said original main weight, and
arranging said auxiliary weight for causing its c.g. to be aligned horizontally with the fulcrum when original main weight is located at the predetermined position at which the reading index indicates "zero".

16. In an unequal arm beam balance, the method of conversion of the balance from weighing in English weight units to weighing in metric weight units, as claimed in claim 10, in which:
said increased moment effect of said secondary weight action is provided by spacing said range of secondary metric graduations over a distance along said secondary beam which is proportionately 10.231% longer than said range of secondary English graduations, and
providing said secondary weight with reading index means associated therewith for indicating which of said secondary English or metric graduations corresponds with the selected position occupied by said secondary weight.

17. In an unequal arm beam balance, the method of conversion of the balance from weighing in English weight units to weighing in metric weight units, as claimed in claim 10, in which:
said increased moment effect of said secondary weight action is provided by coupling an auxiliary weight to the original secondary weight for movement together therewith, said auxiliary weight having a weight equal to 10.231% of the weight of said original secondary weight, and the c.g. of said auxiliary weight when coupled to said secondary weight is horizontally aligned with the c.g. of the secondary weight.

18. In an unequal arm beam balance, the method of conversion of the balance from weighing in metric weight units to weighing in English weight units, as claimed in claim 3, including the steps of:
blanking a portion of the main metric graduations with said additional weight, and
providing a reading index on said additiynal weight for showing the user which of said main English graduations corresponds with the positioning of said increased main weight.

19. In an unequal arm beam balance having a receptacle onto which objects to be weighed are placed and having a weighing arm which swings up and down about a fulcrum during a weighing operation, this weighing arm including a main beam along which an original main weight can be moved into discrete predetermined positions as defined by discrete notches, said original main weight being positionable along said main beam and having a locator element engageable in said discrete notches for selectively locating said main weight at any one of said predetermined positions, said main weight being intended for making weight measurements, said weighing arm also including a parallel secondary beam along which a secondary weight can be slid into any desired position for making measurements of values of weight intermediate the values of weight corresponding to selected predetermined positions of said main weight,
apparatus for conversion of the balance from weighing in metric weight units to weighing in English weight units, and vice versa, comprising:
a main metric weight scale extending along said main beam having main metric weight graduations corresponding to respective predetermined positions of said main weight,
at least one of said main metric graduations corresponding to 400 N grams (where "N" is a positive integer lying in the range up to 1,000),
a main English weight scale also extending along said main beam having main English weight graduations corresponding to respective predetermined positions of said main weight,
said main English scale including a graduation of which the indicated value is "N" pounds and which corresponds in position to the main metric graduation having an indicated value of 400 N grams,
means for increasing the weight positionable along said main beam by 13.398%, and for maintaining the c.g. of said increased weight in horizontal alignment with the c.g. of said weight,
a secondary metric scale extending along said secondary beam having indicated values at least spanning a range of values equal to the differential in indicated value between successive main metric graduations, a secondary English scale extending along said secondary beam having indicated values at least spanning a range of values equal to the differential in indicated value between successive main English graduations, and means for proportionately increasing the moment effect of the secondary weight action by 13.398% with respect to the secondary English scale as compared with the secondary metric scale.

20. In an unequal arm beam balance, apparatus for conversion of the balance from weighing in metric weight units to weighing in English weight units, and vice versa, as claimed in claim 19, in which:

said means for increasing the weight positionable along said main beam by 13.398% is an auxiliary weight adapted to be coupled to the main weight for movement in unitary relationship therewith and having its c.g. in horizontal alignment with the c.g. of said main weight.

21. In an unequal arm beam balance, apparatus for conversion of the balance from weighing in metric weight units to weighing in English weight units, and vice versa, as claimed in claim 20, in which:

said auxiliary weight has a cover portion associated therewith for covering over a part of the main metric scale, and said auxiliary weight has an index associated therewith for indicating the English graduation to be read by the user.

22. In an unequal arm beam balance, apparatus for conversion of the balance from weighing in metric weight units to weighing in English weight units, and vice versa, as claimed in claim 19, in which:

said means for increasing the proportionate moment effect of the secondary weight by 13.398% is an auxiliary weight adapted to be mounted on the secondary weight for movement in unitary relationship therewith and having its c.g. in horizontal alignment with the c.g. of said secondary weight.

23. In an unequal arm beam balance, apparatus for conversion of the balance from weighing in metric weight units to weighing in English weight units, and vice versa, as claimed in claim 19, in which:

said means for increasing the proportionate moment effect of the secondary weight by 13.398% when making weight measurements in English units is an expansion of the length of said secondary English scale relative to said secondary metric scale while using the same secondary weight for making weight measurements in either metric or English units, and said secondary weight having index means thereon for indicating the secondary metric or English scale graduations to be read.

24. In an unequal arm beam balance having a receptacle onto which objects to be weighed are placed and having a weighing arm which swings up and down about a fulcrum during a weighing operation, this weighing arm including a main beam along which an original main weight can be moved into discrete predetermined positions as defined by discrete notches, said original main weight being positionable along said main beam and having a locator element engageable in said discrete notches for selectively locating said main weight at any one of said predetermined positions, said main weight being intended for making weight measurements, said weighing arm also including a parallel secondary beam along which a secondary weight can be slid into any desired position for making measurements of values of weight intermediate the values of weight corresponding to selected predetermined positions of said main weight, apparatus for conversion of the balance from weighing in English weight units to weighing in metric weight units, and vice versa, comprising:

a main English weight scale extending along said main beam having main English weight graduations corresponding to respective predetermined positions of said main weight, at least one of said main English graduations corresponding to 2 N pounds (where "N" is a positive integer lying in the range up to 1,000), a main metric weight scale also extending along said main beam having main metric weight graduations corresponding to respective predetermined positions of said main weight, said main metric scale including a graduation of which the indicated value is "N" kilograms and which corresponds in position to the main English graduation having an indicated value of 2 N pounds, means for increasing the weight positionable along said main beam by 10.231% when making metric weight measurements and for maintaining the c.g. of said increased weight in horizontal alignment with the c.g. of said weight, a secondary English scale extending along said secondary beam having indicated values at least spanning a range of values equal to the differential in indicated value between successive main English graduations, a secondary metric scale extending along said secondary beam having indicated values at least spanning a range of values equal to the differential in indicated value between successive main metric graduations, and means for proportionately increasing the moment effect of the secondary weight action by 10.231% with respect to the secondary metric scale as compared with the secondary English scale.

25. In an unequal arm beam balance, apparatus for conversion of the balance from weighing in English weight units to weighing in metric weight units, and vice versa, as claimed in claim 24, in which:

said means for increasing the weight positionable along said main beam by 10.231% is an auxiliary weight adapted to be coupled to the main weight for movement in unitary relationship therewith.

26. In an unequal arm beam balance, apparatus for conversion of the balance from weighing in English weight units to weighing in metric weight units, and vice versa, as claimed in claim 25, in which:

said auxiliary weight has a cover portion associated therewith for covering over a part of the main English scale, and said auxiliary weight has an index associated therewith for indicating the metric graduation to be read by the user.

27. In an unequal arm beam balance, apparatus for conversion of the balance from weighing in English weight units to weighing in metric weight units, and vice versa, as claimed in claim 24, in which:

said means for increasing the proportionate moment effect of the secondary weight by 10.231% is an auxiliary weight adapted to be mounted on the secondary weight for movement in unitary relationship therewith and having its c.g. in horizontal alignment with the c.g. of said secondary weight.

28. In an unequal arm beam balance, apparatus for conversion of the balance from weighing in metric weight units to weighing in English weight units, and vice versa, as claimed in claim 24, in which:

said means for increasing the proportionate moment effect of the secondary weight by 10.231% when making weight measurements in metric units is an expansion of the length of said secondary metric scale relative to said secondary English scale while using the same secondary weight for making weight measurements in either English or metric units, and said secondary weight having index means thereon for indicating the secondary English or metric scale graduations to be read.

* * * * *